1,481,444

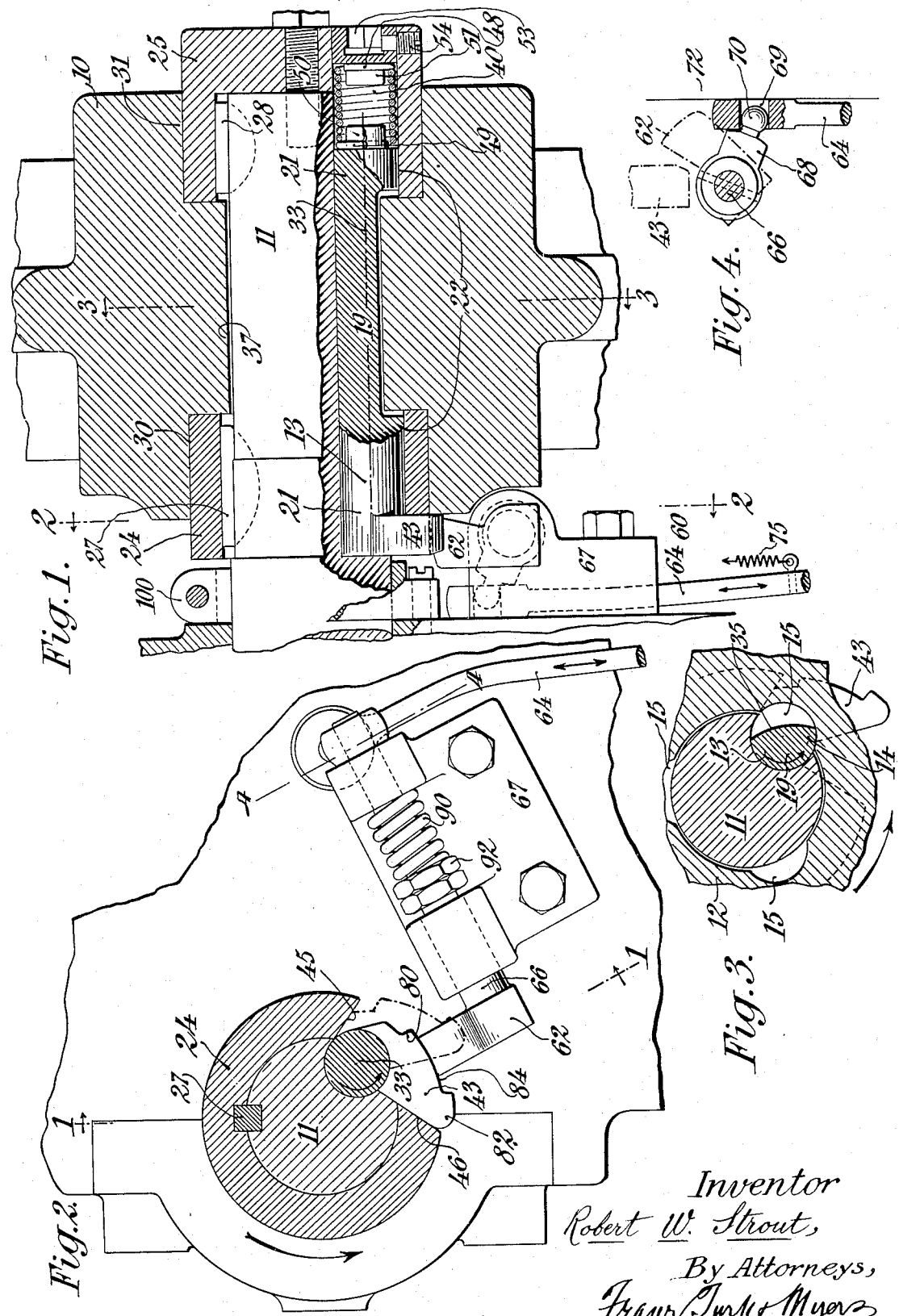
Jan. 22, 1924.  
R. W. STROUT  
CLUTCH  
Filed Nov. 2, 1921  
1,481,444
Inventor  
Robert W. Strout,  
By Attorneys,  
Fraser Tuke & Myers Patented Jan. 22, 1924.

UNITED STATES PATENT OFFICE.

ROBERT W. STROUT, OF BROOKLYN, NEW YORK, ASSIGNOR TO E. W. BLISS COMPANY, OF BROOKLYN, NEW YORK, A CORPORATION OF WEST VIRGINIA.

CLUTCH.

Application filed November 2, 1921. Serial No. 512,214.

*To all whom it may concern:*

Be it known that I, ROBERT W. STROUT, a citizen of the United States of America, residing in the borough of Brooklyn, county of Kings, city and State of New York, have invented certain new and useful Improvements in Clutches, of which the following is a specification.

This invention relates to improvements in clutches and aims to provide improvements therein.

The invention is an improvement on the clutch shown in United States Patents No. 710,199, granted September 30, 1902, to William Klocke, and No. 991,775, granted May 9, 1911, to John J. Flynn, and provides a clutch wherein there is a precise disengagement of the clutch key, thereby avoiding wear and jarring, and consequent noise, between the clutch-key and the notched part with which the key engages; it further provides a clutch wherein the control-pawl acts to effectively stop the driven part upon an excessive movement thereof after the driving and driven parts are disengaged, and also wherein the shock on the pawl is effectively cushioned. The clutch is moreover simple in construction, durable, and reliable in action. The invention, in general, provides a clutch having an improved action and construction as regards that of the patents above referred to.

An embodiment of the invention is illustrated in the accompanying drawing, in which—

Figure 1 is a view principally in section on the line 1—1, Fig. 2 of parts of a press having the clutch applied thereto, only so much of the press being shown as is necessary to illustrate the invention.

Fig. 2 is a sectional view on the line 2—2 of Fig. 1.

Fig. 3 is a sectional view on the line 3—3 of Fig. 1, and

Fig. 4 is a sectional view on the line 4—4 of Fig. 2, certain parts in advance of the plane of section being shown in dotted lines.

In said drawings, numeral 10 designates the driving or running part of the clutch, and 11 the driven or passive part. The part 10 is conveniently the fly wheel pulley of a press, and the part 11 is conveniently the shaft (ordinarily the crank shaft) of the press, and the construction and operation of the clutch parts is ordinarily such as to automatically disengage the parts 10 and 11 after each stroke of the press, the parts 10 and 11 being engaged by the manual or pedal operation of a suitable part each time a stroke of the press is desired.

13 designates a clutch-key, journalled preferably in the passive parts 11 of the clutch, and having an engaging part 14 adapted to move, or to be moved, into and out of engagement with a notch or shoulder portion 15 or with one of several notches 15, in the running or driving part 10 of the clutch. The key 13 is conveniently in the form of a round pin or rod having a segmental portion cut out therefrom leaving a segmental portion 19 constituting the engaging portion 14. The key 13 is conveniently left round and of full diameter at both ends, as indicated at 21, which ends fit in corresponding sockets 22 in the shaft or part 11. The shaft 11 is conveniently enlarged adjacent the end portions of the key, as indicated at 24, 25, and these enlargements are conveniently in the form of sleeves keyed to the shaft, as indicated at 27, 28. These enlargements serve as journals for the driving or running part 10, said part 10 being correspondingly recessed, as indicated at 30, 31, whereby the part 10 has an uninterrupted bearing on the part 11 and also permits a clearance 37 to be made between the wheel 10 and the shaft 11 whereby any small abrasions of the engaging surfaces of the clutch become harmless and whereby still further latitude in the free position of the clutch is possible. The enlargements 24, 25 also enable the sockets 22 to be partially formed therein, whereby the round portions 21 of the clutch-key or pin 13 may be of the full diameter of the pin or rod from which it is formed.

The axis 33 of the clutch-key 13 is located close to the circumference of the shaft 11, in such manner that the engaging portion 14 may enter a recess or notch 15. Moreover the profile 35 of the segmental portion 19 is cut on an arc having its center in the center of the shaft 11, and in such manner as to occupy a position flush with the circumference of the shaft 11 in the disengaged position of said key.

Clutching and declutching is effected by oscillating or turning the key 13 on its axis 33 in such manner as to bring the segmental or engaging portion 14 into and out of position in the notch 15 of the driving part 10, as shown in Fig. 3. In the position shown in Fig. 3 the engaging portion 14 projects into the notch 15, and hence the driving and driven parts 10 and 11 are in engagement and the shaft 11 is consequently driven. By turning the key 13 so that the profile 35 of the segmental portion 19 is flush with the circumference of the shaft, said segmental portion will be out of position to engage in a notch 15, and hence the driving part 10 will be free to turn without driving the shaft or driven part 11. The part 37 of the driving part 10, between the bearing recesses 30 and 31 is preferably formed with a slight clearance, so that there is no contact between said portion 37 of the driving part 10, and the profile 35 of the segmental portion 19 of the key 13, in the position of said key wherein the said profile 35 is flush with the circumference of the said shaft 11.

The key 13 is conveniently normally pressed by means of a spring 40 in a direction to turn it into a position to engage in a notch 15, and said key is disengaged from said notch by turning it against the action of the said spring 40, conveniently through an arm 43 on the key 13. The turning of the key is conveniently limited by shoulders 45, 46 on the sleeve 24, against which the arm 43 is adapted to abut, the arm 43 being normally pressed by the spring 40 against the said shoulder 45.

The spring 40 is conveniently a relatively light coiled spring having its ends 48, 49 turned diametrically across the coil. The key 13 is provided with a bifucated stud 50 at one of its ends, in which the end portion 49 of the spring is held, and an opposite end 48 of the spring is received in a corresponding bifurcated stud 51 on a plug 53 secured in the end of the socket 22, as indicated at 54. The spring 40 is hence coaxial with the bearing portion 21 of the key 13, and functions as a torsion spring. By this construction the spring is conveniently housed, and the direction of application of its force does not change as the key 13 turns.

Suitable means 60 for automatically turning the key 13 to disengage it from the driving part 10 is conveniently provided, and this means preferably comprises a rocking pawl 62 which may be connected to a treadle rod 64. The pawl 62 is conveniently mounted upon a rock shaft 66 journaled in a bracket 67 and having an arm 68 thereon, to which arm the treadle rod 64 is conveniently connected. The treadle rod 64 conveniently has an eye 69 in its end, which engages a ball 70 on said arm 68. The said treadle rod 64 conveniently slides against an adjacent part 72 of the press frame, and the said adjacent part 72 of the press frame conveniently acts to hold the eye 69 and ball 70 connected. A spring 75 may be provided for normally turning the pawl 62 into position to engage the arm 43. The spring 75 is conveniently connected to the treadle rod 64, and consequently acts through the said treadle rod 64 on the rock shaft 66 carrying the said pawl 62.

The arm 43 is preferably formed with an abrupt shoulder 80, a hooked end 82, and a portion 84 concentric with the shaft 11 in the position of such arm shown in Fig. 2, that is in a position where the clutch-key 13 is disengaged from a recess 15 in the driving part 10.

Moreover the pawl 62 and its rock shaft 66 are preferably so arranged that the direction of reaction to the impact between said shoulder 80 and said pawl 62 is substantially tangential (or parallel to a tangent) to the circle of revolution of said shoulder 80 at the point of impact.

The pawl 62 is preferably resiliently mounted in the direction of the reaction to impact. To this end a spring 90 is arranged around the shaft 66 and bears at one end on a collar or nut 92 on said shaft 66, and bears at its other end upon the bracket 67.

In the position of said key 13 in which it is engaged with a notch 15 the shoulder 80 on the arm 43 projects slightly beyond the circumference of the shaft 11 (or the enlargement 24 thereon). When this projecting shoulder 80 strikes the pawl 62 (at the end of the rotation of the shaft 11) the arm 43 is turned, thereby turning the key 13 so as to move the engaging portion 14 thereof out of engagement with the notch 15 in the driving part 10. As the arm 43 turns around the axis 33 of the key 13 the shoulder 80 moves in towards the center of the shaft 11, whereupon the said shoulder becomes flush with, or projects less beyond, the circumference of the shaft 11 (or sleeve 24). The impact between the shoulder 80 and the pawl 62 slightly compresses the spring 90, and this compression effects two purposes. First, it cushions the shock or impact, and secondly, it causes the pawl 62 to rebound toward the shoulder 80, insuring that the pawl will pass over said shoulder 80 on to the concentric portion 84 of the arm 43, thereby assuring that the key 13 will be held in a position whereby no part of the segmental portion 19 of the key, especially the corner connecting the profile 35 and the circular portion of the key, will project beyond the circumference of the shaft 11. That is, all parts of the profile 35 of the key will be flush with the circumference of the shaft 11.

Ordinarily the driven part or shaft 11 of a press turns under the resistance of a brake 100. The friction of this brake is variable according to the work to be done on the press. Consequently there is a greater or less time interval between the time that the driven part or shaft 11 is disengaged by the clutch, and the time it comes to a stop.

Under certain conditions, especially where the friction of the brake 100 is considerable, with clutches as heretofore constructed, the pawl would not operate to hold the clutch key precisely or strictly flush with the circumference of the shaft, in the disengaged position of said clutch key. There occurs consequent wearing or gnawing of the clutch key, and noise which disconcerts the press operator, and sometimes this imperfect action results in parts of the clutch being broken and the press accidentally or unintentionally started. By the action above described, of the present clutch, such wearing of the clutch key, noise, and danger of accidental starting are effectively avoided.

In the case the brake 100 exerts too light friction on the shaft 11, the momentum of the shaft 11 may cause the shaft 11 to rotate for a considerable interval after the clutch-key has disengaged the driving part 10. The hook 82 on the arm 43 limits this movement of the shaft 11. When the hook 82 strikes the end of the pawl 62 the rotation of the shaft 11 is stopped and the spring 90 acts to cushion the impact between the hook 82 and the pawl 62.

The inventive ideas herein set forth may receive other mechanical expressions from those specifically illustrated and described.

What is claimed is:

1. A clutch comprising a driving and a driven part, one of said parts having a clutch key for engaging the other part to effect driving thereof, and means for operating said clutch key comprising a pawl, said key having a shoulder adapted to be struck by said pawl to move said key out of clutching engagement, and a portion on said key immediately beyond said shoulder concentric with said driven part when pressed back by said pawl against which said pawl is adapted to press to hold said key precisely out of engaging position, said pawl being resiliently mounted, whereby to cushion the shock of impact of said key and pawl, and whereby to enable said pawl to rebound against said key to insure contact of said pawl with said portion of said key beyond said shoulder.

2. A clutch comprising a driving and a driven part, one of said parts having a clutch key for engaging the other part to effect driving thereof, and means for operating said clutch key comprising a pawl, said key having a part adapted to be struck by said pawl to move said key out of clutching engagement, and a portion on said key beyond said portion which is initially struck against which said pawl is adapted to press to hold said key precisely out of engaging position, said pawl being resilient in the direction of a tangent to the circle of revolution of said initially struck portion at the point of impact between said pawl and said initially struck portion whereby to cushion the shock of impact of said key and pawl, and whereby to enable said pawl to rebound against said key to insure contact of said pawl with said portion of said key beyond said portion which is initially struck.

3. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key immediately beyond said shoulder concentric with said driven part when pressed back by said pawl against which said pawl is adapted to press to hold said key precisely out of engaging position.

4. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key beyond said shoulder against which said pawl is adapted to press to hold said key precisely out of engaging position, said pawl being resilient in the direction of a tangent to the circle of revolution of said shoulder at the point of impact between said pawl and shoulder, whereby to cushion the shock of impact of said key and pawl, and whereby to enable said pawl to rebound against said key to insure contact of said pawl with said portion of said key beyond said shoulder.

5. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key beyond said shoulder against which said pawl is adapted to press to hold said key precisely out of engaging position, said pawl comprising a rock-shaft upon which it is mounted, said rock-shaft being movable axially substantially parallel to a tangent at the point of impact between said pawl and said shoulder, and a spring, pressing on said rock-shaft in an axial direction to enable said pawl to yield, said resilient pawl acting to cushion the shock of impact of said key and pawl, and rebounding against said key to insure contact of said pawl with said portion of said key beyond said shoulder.

6. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key beyond said shoulder against which said pawl is adapted to press to hold said key precisely out of engaging position and a stop beyond said last mentioned portion of said key adapted to abut against said pawl to limit the movement of said part on which said key is caried.

7. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key beyond said shoulder against which said pawl is adapted to press to hold said key precisely out of engaging position and a stop beyond said last mentioned portion of said key adapted to abut against said pawl to limit the movement of said part on which said key is carried, said pawl being resiliently mounted, whereby to cushion the initial shock of impact of said key and pawl, whereby to enable said pawl to rebound against said key to insure contact of said pawl and said portion of said key beyond said shoulder, and whereby to cushion the shock of impact of said stop and said pawl.

8. A clutch comprising a driving and a driven part, one of said parts having a clutch-key for engaging the other part to effect driving thereof, and means for operating said clutch-key comprising a pawl, said key having a shoulder adapted to be struck by said pawl to move said key out of clutching engagement, and a portion on said key beyond said shoulder against which said pawl is adapted to press to hold said key precisely out of engaging position and a stop beyond said last mentioned portion of said key adapted to abut against said pawl to limit the movement of said part on which said key is carried, said pawl being resilient in the direction of a tangent to the circle of revolution of said shoulder at the point of impact between said pawl and shoulder, whereby to cushion the initial shock of impact of said key and pawl, whereby to enable said pawl to rebound against said key to insure contact of said pawl and said portion of said key beyond said shoulder, and whereby to cushion the shock of impact of said stop and said pawl.

9. A clutch comprising a driving and a driven part, one of said parts having a clutch-key for engaging the other part to effect driving thereof, said clutch-key being oscillatory on an axis longitudinally thereof and having spaced bearing portions and an engaging portion between said bearing portions, and a spring for turning said clutch-key on its axis, said spring being coaxial with said key beyond said bearing portions.

10. A clutch comprising a driving and a driven part, one of said parts having a clutch-key for engaging the other part to effect driving thereof, said clutch-key being oscillatory on an axis longitudinally thereof and having spaced bearing portions and an engaging portion between said bearing portions, and a spring for turning said clutch-key on its axis, said parts having a recess therein coaxial with said key, said spring being housed in said recess beyond said bearing portions.

11. A clutch comprising a driving and a driven part, one of said parts having a clutch-key for engaging the other part to effect driving thereof, said clutch-key being oscillatory on an axis longitudinally thereof and having spaced bearing portions and an engaging portion between said bearing portions, and a spring for turning said clutch-key on its axis, said spring being a torsion spring coaxial with said key beyond said bearing portions.

In witness whereof, I have hereunto signed my name.

ROBERT W. STROUT.